(12) United States Patent
Jenkins et al.

(10) Patent No.: US 6,883,999 B1
(45) Date of Patent: Apr. 26, 2005

(54) TROWEL GEARBOX BRAKE

(75) Inventors: Michael Jenkins, Slinger, WI (US); Gregory Kruepke, Waukesha, WI (US)

(73) Assignee: Wacker Corporation, Menomonee Falls, WI (US)

( * ) Notice: Subject to any disclaimer, the term of this patent is extended or adjusted under 35 U.S.C. 154(b) by 13 days.

(21) Appl. No.: 10/704,503

(22) Filed: Nov. 7, 2003

(51) Int. Cl.[7] .............................................. E01C 19/22
(52) U.S. Cl. .................. 404/112; 192/129 R
(58) Field of Search .................. 404/72, 112; 451/353; 192/13 A, 129 R

(56) References Cited

U.S. PATENT DOCUMENTS

| | | |
|---|---|---|
| 2,734,932 A | 12/1956 | Barnes |
| 2,875,676 A | 3/1959 | Thieme et al. |
| 2,882,806 A | 4/1959 | Thieme et al. |
| 4,232,980 A | 11/1980 | Tertinek et al. |
| 4,629,359 A | 12/1986 | Sengupta |
| 6,422,786 B1 | 7/2002 | Grant |
| 6,592,290 B2 | 7/2003 | Jaszkowiak |

FOREIGN PATENT DOCUMENTS

GB   1 473 738   *   5/1977

* cited by examiner

Primary Examiner—Gary S. Hartmann
(74) Attorney, Agent, or Firm—Boyle Fredrickson Newholm Stein & Gratz S.C.

(57) ABSTRACT

A brake of a concrete finishing trowel responds automatically to the cessation of drive torque delivery to the rotor to actively brake the trowel's drive train, hence inhibiting or preventing frame rotation. The brake preferably takes advantages of inherent characteristics of an inclined gear, such as a worm of a gearbox, to permit an internal component of the gearbox to shift automatically upon the cessation of drive torque therethrough from a brake released position to a brake engaged position. In the case of a worm gear-based gearbox, the worm is configured such that reaction forces that are normally generated by the delivery of drive torque therethrough shift the worm to release the brake during normal trowel operation. These forces are eliminated in the absence of drive torque transfer, permitting the worm to shift to a brake engaged position.

28 Claims, 5 Drawing Sheets

TROWEL GEARBOX BRAKE

BACKGROUND OF THE INVENTION

1. Field of the Invention

The invention relates to concrete finishing trowels and, more particularly, relates to a concrete finishing trowel having a drive train that is braked automatically upon the cessation of drive torque delivery therethrough. The invention additionally relates to an automatically braked gearbox usable with such a trowel and to a method of braking such a gearbox.

2. Discussion of the Related Art

Walk behind trowels are generally known for the finishing of concrete surfaces. A walk behind trowel generally includes a rotor formed from a plurality of trowel blades that rest on the ground. The rotor is driven by a motor mounted on a frame or "cage" that overlies the rotor. The trowel is controlled by an operator via a handle extending several feet from the cage. The rotating trowel blades provide a very effective machine for finishing mid-size and large concrete slabs. However, walk behind trowels have several drawbacks.

For instance, the rotating blades impose substantial torque on the cage that normally is counteracted by the operator through the handle. If the operator releases the handle while the rotor is being driven, the torque may cause the trowel to spin undesirably. In order to avoid this potential problem, some trowels employ an automatic disconnect or kill switch that shuts down the engine or otherwise stops delivery of drive torque to the rotor if the operator releases the handle and/or if a sensor determines that the trowel is spinning at a rate indicative of loss of operator control. A trowel employing an automatic engine shut-down mechanism is disclosed, for example, in U.S. Pat. No. 2,734,932 to Barnes. A trowel that relies on release of a dead man lever or similar structure to shut down a trowel's engine or disengage a clutch upon operator release of a steering handle is disclosed in U.S. Pat. No. 4,629,359 to Sengupta.

However, merely shutting down the engine or otherwise ceasing the delivery of drive torque to the trowel's rotor does not necessarily prevent the trowel from spinning because the handle and cage have considerable momentum at the time of shut down. The trowel may spin through a substantial arcuate range of a complete revolution or more while that momentum is being spent. This slow response to an attempted shut down is undesirable.

Attempts have been made to mitigate this problem through the incorporation of active brakes in the trowel's drive train that are designed to prevent or at least inhibit rotation of the trowel's frame.

For instance, U.S. Pat. No. 4,280,980, assigned to Stone, discloses a combined clutch/brake coupling a drive belt of the trowel's drive system to the input shaft of the trowel's gearbox. The clutch must be manually-engaged by displacing a lever mounted on the handle. The clutch may be manually disengaged by manual operation of the handle. It may also be disengaged automatically through the operation of a centrifugal weight that is responsive to undesirable rapid spinning of the trowel. In either event, movement of the handle to the clutch disengaged position activates a spring-applied pad-type brake that acts on the drive belt. Although this device works reasonably well, it exhibits several drawbacks. For instance, it is usable only with a manually actuated clutch that is actuated by the operator only at the expense of release or partial release of the handle. The clutch activation lever also is open to the outside, exposing the internal components of the clutch to contamination by dirt, debris, water, etc. In addition, the clutch brake engages automatically only if a mechanical sensor indicates that the trowel is undergoing unacceptable centrifugal forces. It does not react to an "ordinary" engine shut down situation in which torque transfer to the rotor ceases in the absence of such centrifugal forces. The brake also imposes significant drag on the drive belt, accelerating wear on the drive belt. Finally, braking forces imposed on the clutch are generated solely by the strength of the spring and, therefore, are independent of backdrive forces imposed on the system's drive train by the rotor.

Other brakes are available for other applications that brake a clutch directly rather than braking a drive belt leading from the clutch to the gearbox. Known clutch brakes lack some of the drawbacks of the Stone clutch brake but have drawbacks of their own, rendering them poorly suited for use with a trowel. One such clutch brake is manufactured by North American Clutch Manufacturing (NORAM). The NORAM brake is a manually engaged brake taking the form of a deadman's switch operated by a control lever much like that commonly found on a walk behind lawnmower. The brake is engaged automatically when the operator releases the control lever to brake the clutch. This brake also works reasonably well, but requires that the operator squeeze the control lever at all times while operating the trowel. This continuous squeezing requirement leads to considerable operator fatigue and also requires that the operator divert a substantial portion of his or her attention to operation of the control lever, hindering his or her ability to adequately steer the trowel. In addition, the NORAM clutch brake, like that employed by the brake of the Stone machine, imposes braking forces that are independent of the magnitude of backdrive forces generated by the machine's output. In addition, as with the Stone system, the range of clutches useful with this type of system is considerably limiting.

Still another type of clutch brake, offered by Ogura, is electrically powered. An electrically powered clutch brake requires the presence of a reliable power supply to prevent the brake from wearing or seizing. The magneto employed as an electrical power source for a typical walk behind trowel is ineffective for the purpose. Adding additional components to the trowel to upgrade the power supply would add additional cost and weight to the trowel.

The need therefore has arisen to automatically brake a drive train of a concrete finishing trowel upon the cessation of drive torque delivery to the trowel's rotor without interfering with the operator's ability to steer and control the trowel and without significantly adding to the cost or complexity of the trowel.

The need has also arisen to provide a drive train brake that satisfies the precedingly described need and that does not significantly add to the cost or weight of the trowel.

The need has additionally arisen to provide a brake that satisfies the first-mentioned need while still being compatible with a variety of different drive systems.

SUMMARY OF THE INVENTION

Pursuant to the invention, a brake is incorporated into a concrete finishing trowel's drive train that responds automatically to the cessation of drive torque delivery to the rotor to actively brake the drive train, hence inhibiting or preventing rotation of the trowel's frame. In a preferred embodiment, the brake takes advantages of inherent characteristics of an inclined gear of a gearbox to permit an internal component of the gearbox to shift axially upon the cessation of drive torque delivery to the gearbox to engage the brake. For instance, in the case of a worm gear-based gearbox, the brake may be mounted on a worm shaft or related component of the gearbox that is responsive to reaction forces imposed thereon upon the delivery of drive torque thereto. The component shifts axially in one direction to release the brake in the presence of the reaction forces and shifts axially in an opposite direction in the absence of the reaction forces to apply the brake. The resulting system has several advantages over clutch-type brakes used on other systems. It is also compatible with any clutch and any torque delivery system. In addition, because it is engaged and released fully automatically, it does not in anyway interfere with or hinder the operator's ability to steer or otherwise operate the machine.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

As indicated above, the invention resides in the automatic braking of an active component of a rotary trowel's drive train in response to the cessation of torque transfer to the rotor from the trowel's prime mover in order to inhibit or prevent undesired rotation of the trowel's frame and handle. Preferably, the brake moves with a component of the drive train that is subject to axial reaction forces upon the delivery of drive torque therethrough. A preferred embodiment of the invention will now be described in conjunction with a walk behind trowel having an internal combustion engine as a prime mover and a brake built into the trowel's gearbox. However, the invention is not so limited. It also potentially applies to ride on trowels and/or to a brake that acts on components of the trowel's drive system other than the gearbox.

2. System Overview

Figure 1:
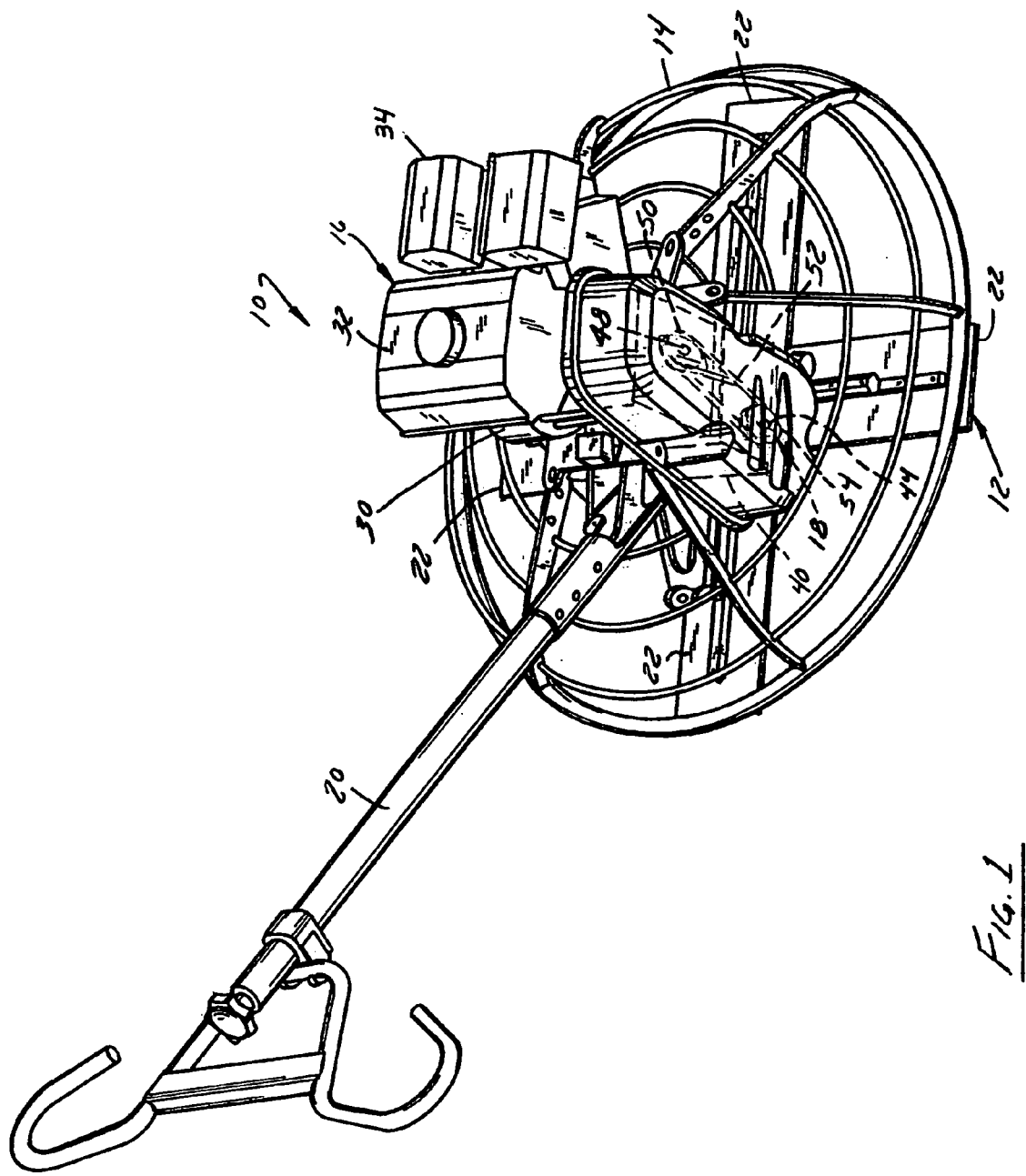
FIG. 1 is a perspective view of a walk-behind trowel incorporating an automatic gearbox brake constructed in accordance with a preferred embodiment of the present invention.
Figure 2:
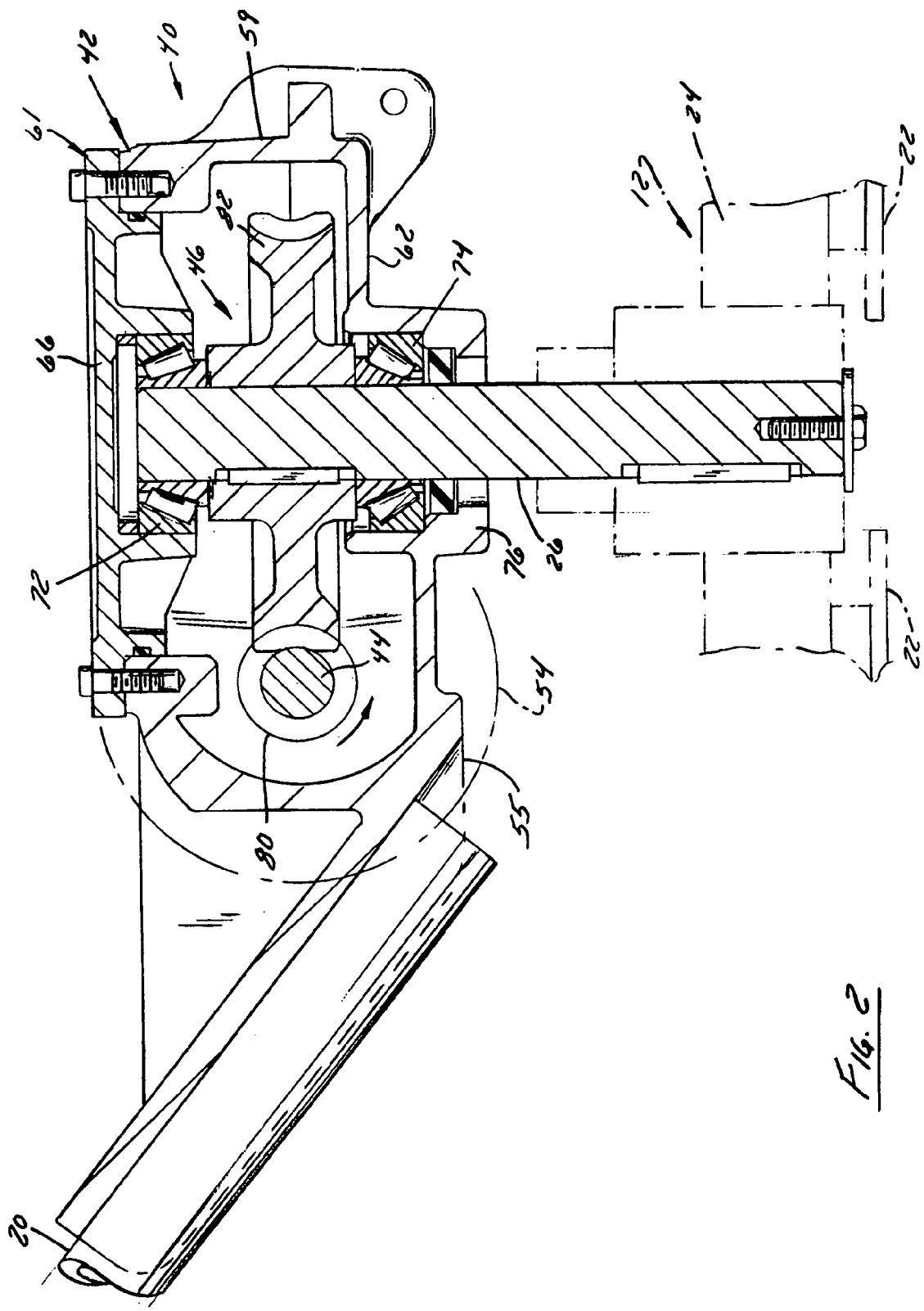
FIG. 2 is a sectional side elevation view of a gearbox of the trowel of FIG. 1.
Figure 3:
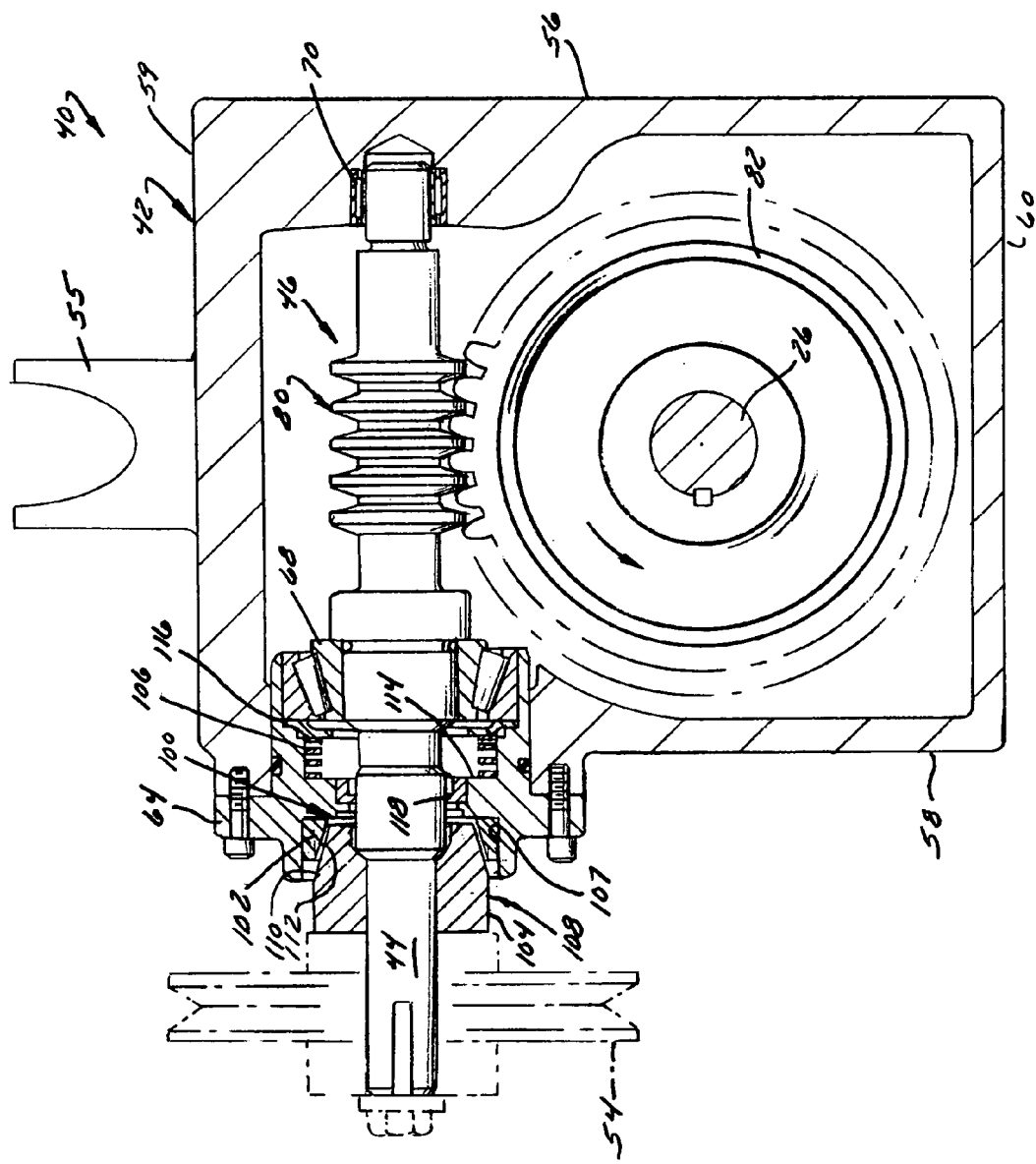
FIG. 3 is a sectional top plan view of the gearbox of FIG. 2, showing a gearbox brake in a disengaged position thereof.
Figure 4:
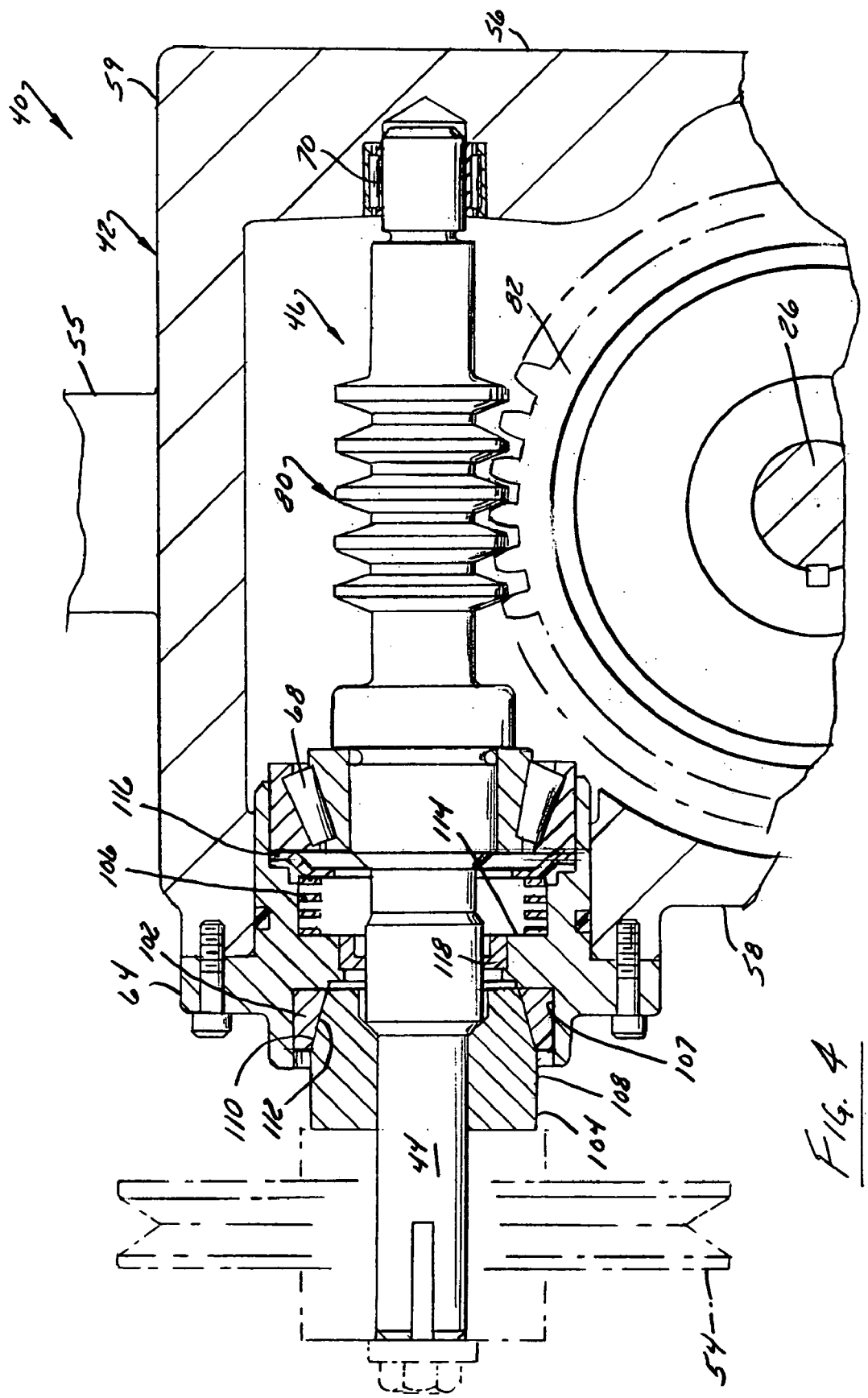
FIG. 4 corresponds to FIG. 3 and shows the brake in an engaged position thereof.
Figure 5:
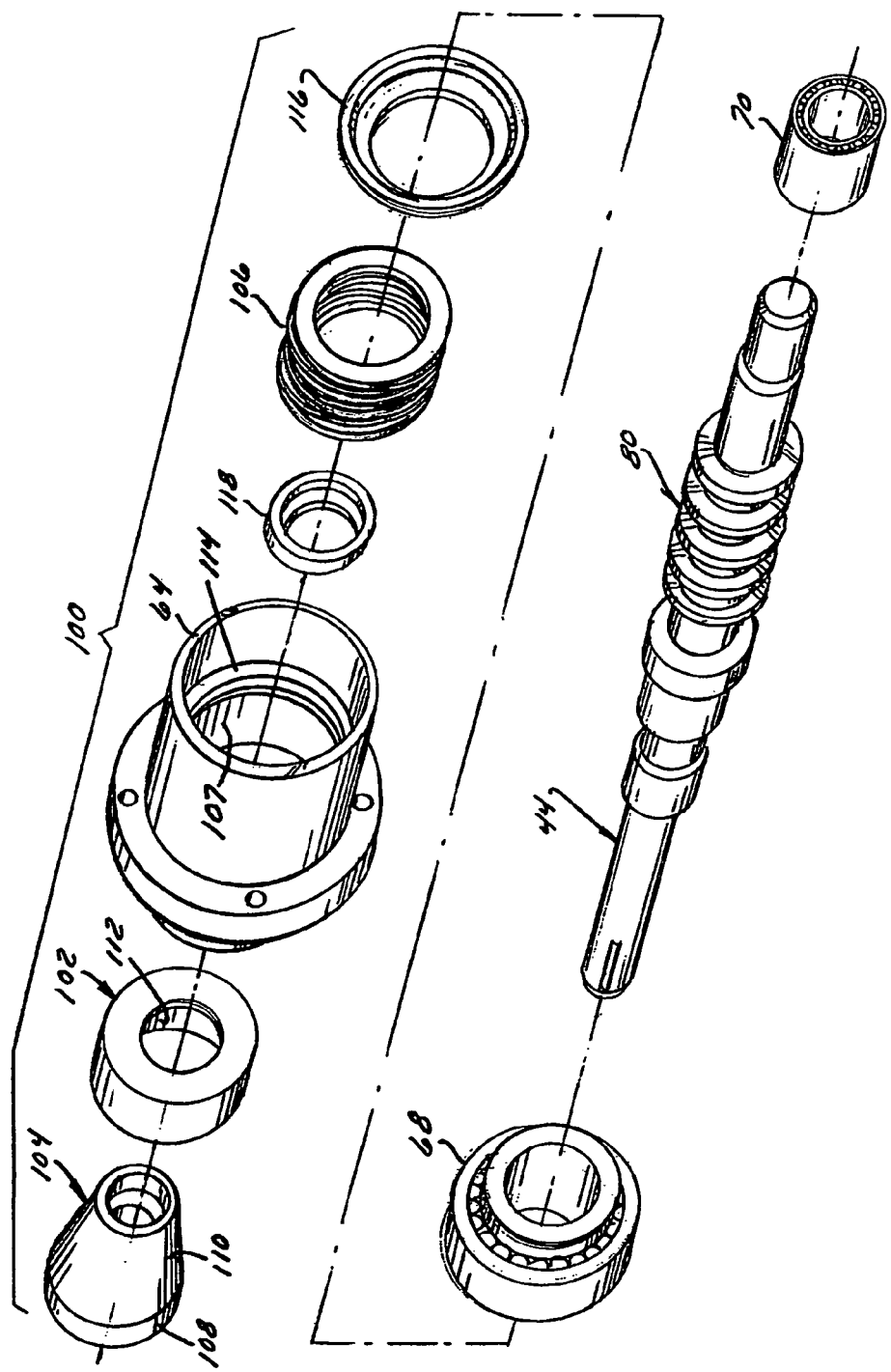
FIG. 5 is an exploded perspective view of the brake of FIGS. 3 and 4.

Referring to FIG. 1, a walk behind trowel 10 is illustrated that incorporates a gearbox brake assembly 100 (FIGS. 3–5) constructed in accordance with a preferred embodiment of the invention. In general, the walk behind trowel includes a rotor 12, a frame or "cage" 14 that overlies and is supported on the rotor 12, an engine 16 that is supported on the frame 14, a drive train 18 operatively coupling the engine 16 to the rotor 12, and a handle 20 for controlling and steering the trowel 10. Referring to FIGS. 1 and 2, the rotor 12 includes a plurality of trowel blades 22 extending radially from a hub 24 which, in turn, is driven by a vertical shaft 26. The shaft 26 of this embodiment comprises the gearbox output shaft (detailed below). Alternatively, the shaft 26 could be coupled to the gearbox output shaft either directly or via an interfering torque transfer arrangement.

The motor 16 comprises an internal combustion engine mounted on the cage 14 immediately above the rotor 12. Referring again to FIG. 1, the engine 16 is of the type commonly used on walk behind trowels. It therefore includes a crankcase 30, a fuel tank 32, an air supply system 34, an output shaft (not shown), etc. The motor 16 further includes an ignition system that includes a magneto ignition rotor (not shown). The magneto ignition rotor rotates with the engine output shaft and generates an electrical pulse with every cycle that is sufficiently strong to power a spark plug but insufficiently strong to power electronically actuated peripheral devices such as valves and electronic clutch brakes.

The drive train 18 may be any structure configured to transfer drive torque from the engine output shaft to the rotor input shaft 26. In the illustrated embodiment, it comprises a centrifugal clutch (not shown) coupled to the motor output shaft and a gearbox 40 that transfers torque from the clutch to the rotor input shaft 26. Referring to FIGS. 1–5, the illustrated gearbox 40 is a worm gearbox of the type commonly used on walk behind trowels. It includes a housing 42, an input shaft 44 extending horizontally from the housing 42, the above-described shaft 26 extending vertically from the bottom of the housing 42, and an internal torque transfer system 46 delivering torque from the input shaft 44 to the output shaft 26 and effecting any desired speed change ratio. The input shaft 44 is coupled to an output shaft 48 for the clutch, either directly or, more preferably, via an intervening drive such as a belt drive that includes a drive pulley 50, a belt 52, and a driven pulley 54 (all best seen in FIG. 1). A gear drive or chain drive would also suffice for this purpose.

Referring to FIGS. 2–5, the housing 42 comprises a metal casting that is bolted to the cage 14 and that is connected to the handle 20 by a bracket 55. The housing 42 includes inner and outer (left and right) walls 56 and 58, side walls 59 and 60, and upper and lower walls 61 and 62. Side and top covers 64 and 66 shield openings in the outer and upper walls 58 and 61, respectively, and are selectively removable to expose interior components of the gearbox 40 for inspection or replacement. The input shaft 44 extends horizontally into the housing 42 from an outer end thereof located outside of the housing 42 to an inner end located within the inner wall 56. The input shaft 44 is borne by the housing 42 by a first bearing 68 located in the side cover 64 and a second bearing 70 located in a recess bored into the inner wall 56. As described in more detail below, the bearings 68 and 70 are configured to permit limited sliding movement of the input shaft 44 relative to the housing 42. The output shaft 26 extends vertically into the housing 42 from a first end located below the housing to a second end located above the input shaft 44. The output shaft 26 is rotatably borne in the housing 42 by an upper bearing 72 borne by the upper cover 66 and a lower bearing 74 borne by a boss 76 formed in the bottom wall 62 of the housing 42.

Referring now to FIGS. 2–5, the torque transfer system 46 of this embodiment includes a worm drive that is configured to convert the horizontal rotation of the input shaft 44 to the vertical rotation of the output shaft 26 while also effecting any desired speed change. The worm drive 46 includes a worm 80 and a worm gear 82. The worm gear 82 is keyed or otherwise affixed to the output shaft 26 between the upper and lower bearings 72 and 74 and meshes with the worm 80 such that rotation of the worm 80 about a horizontal axis drives the worm gear 82 and the output shaft 26 to rotate about a vertical axis. The worm 80 is disposed on and preferably formed integrally with the outer periphery of the input shaft 44. As a result, the shaft 44 can be conceptually divided into an input section and a worm section. Alternatively, a worm could be formed from a gear mounted on the input shaft 44 or on another shaft that mates directly or indirectly with the input shaft.

3. Construction and Operation of Brake

As mentioned above, the gearbox 40 is provided with a brake 100 that releases automatically in response to reaction forces on the worm 80 and that is otherwise engaged. More specifically, like all worms, the threads of the worm 80 are "inclined" to the extent that they extend at an angle relative to radial bisectors of the threads. The transfer of torque to the worm gear 82 from these inclined teeth imposes reaction forces that tend to drive the worm 80 and the entrained input shaft 44 axially away from the worm gear 82 or to the left in FIGS. 3 and 4. Most gearboxes are designed to prevent such axial motion. However, pursuant to an embodiment the invention, measures are taken to permit these reaction forces to drive the worm 80 and input shaft 44 axially relative to the housing 42 to release the brake 100. This effect is achieved by configuring the input shaft 44 and/or bearings 68, 70 to be movable axially relative to the housing 42. In the illustrated embodiment, the input shaft 44 is configured to be moveable axially relative to the inner bearing 70, and the outer bearing 68 and input shaft 44 are configured to be movable axially relative to the housing 42. This combination is employed because the inner bearing 70 is relatively lightly loaded, permitting a relatively small needle bearing to be used. Needle bearings can accommodate limited axial movement between themselves and the supported shafts. Conversely, the outer bearing 68 takes up most of the load and, therefore, preferably comprises a tapered roller bearing. Tapered roller bearings cannot accommodate movement between themselves and the borne shaft but can be configured to move axially with the shaft, as is the case in the present embodiment. As a result of this configuration, the worm 80, shaft 44, and bearing 68 are driven axially or to the left in FIGS. 3 and 4 upon the transmission of drive torque to the worm gear 82. The stroke of this movement is relatively small—on the order of 1 to 2 mm, but more than sufficient to release the brake 100.

The brake 100 is configured to be automatically responsive to input shaft motion to disengage when the input shaft 44 shifts to the left upon the transmission of drive torque therethrough, and to automatically engage when the input shaft 44 moves in the opposite direction, either under backdrive forces imposed thereto by the worm gear 82 or by a return spring (detailed below). A variety of different brakes cooperating with the input shaft directly or indirectly in a variety of different manners could operate in this manner. In the currently preferred embodiment, the brake 100 comprises a cone brake located in the vicinity of the outer end of the input shaft 44. A cone brake is preferred because it is simple in design, non-intrusive to the gearbox 40, and easily incorporated into an existing gearbox design. It also does not expose the internal components of the gearbox 40 to contamination by dust or water.

Referring to FIGS. 2–5, the cone brake 100 includes a cup 102, a cone 104, and return spring 106 that biases the cone 104 to an engaged position. The cup 102 surrounds the input shaft 44 and is press-fit or otherwise mounted in a counterbore 107 in the outer gearbox cover 64. The cone 104 is keyed to or otherwise mounted on the outer end of the input shaft 44. It preferably includes a powdered metal cone. The currently preferred metal is FN-0208-105HC, which has an apparent hardness of RC31. The outer periphery of the cone 104 has a cylindrical outer axially surface portion 108 and an axially inner frusto-conical portion 110 that is tapered inwardly from an outer end thereof to an inner end thereof. The surface of the tapered inner frusto-conical portion 10 is configured to rub against a correspondingly tapered surface 112 on the inner periphery of the brake cup 102 to apply the brake 100. The return spring 106 is configured to bias the shaft 44 and, hence, the cone 104 toward the engaged position of FIG. 4, thereby assuring automatic brake engagement upon the cessation of torque transfer to the input shaft 44. A variety of springs could be used and act on a variety of different components so as to directly or indirectly perform the desired biasing effect. In the illustrated embodiment, the spring 106 comprises a spiral wave spring that acts on the bearing 68. It is located in a chamber formed outward of the bearing 68 so as to rest against a radial step 114 of the outer cover 64 at its outer end and against a spacer 116 at its inner end. Finally, a seal 118 is disposed outwardly of the spring chamber for sealing the interior of the housing 42 surface from the environment while still permitting the shaft 44 to move axially relative to the housing 42.

4. Operation of Trowel

During normal operation of the trowel 10, torque is transferred to the gearbox input shaft 44 from the engine's output shaft, the clutch, and the drive train. The worm 80 then transfers torque to the worm gear 82 which, in turn, drives the output shaft 26 to rotate counterclockwise, thereby driving the rotor 12 to rotate. The reaction forces imposed on the teeth of the worm 80 by the teeth of the worm gear 82 drives the input shaft 44 and bearing 68 to the position illustrated in FIG. 3 to drive the cone 104 away from the cup 102, thereby releasing the brake 100 and permitting unobstructed rotation of the input shaft 44 relative to the gearbox housing 42. At some time, cessation of torque delivery to the input shaft occurs, either because the operator shuts down the engine or throttles it back to release the clutch or, in the case of more sophisticated systems, because a sensor such as an accelerometer or a gyroscope detects actual or imminent loss of operator control and generates a signal to disable the drive system. The reaction forces driving the shaft 44 axially to the left in the drawings therefore are removed, permitting the shaft 44 to move to the right or to the brake engaged position of FIG. 4, thereby inhibiting rotation of the cage 14 and handle 20. The cone 104 meshes with the cup 102 to engage the brake 100 as a result of this movement. This movement is driven at least in part by the return spring 106. However, and as a significant aspect of the invention, it may also be driven in part by backdrive force imposed when the rotating output shaft 26 applies torque to the worm 80 through the worm gear 82.

The magnitude of this backdrive force is dependent upon the backdrive torque. Therefore, the magnitude of braking forces generated by the brake 100 are dependent on the magnitude of the backdrive torque, hence resulting in more effective braking when it is most critical.

Both brake engagement and release occur fully automatically. As a result, operator input to both actions is completely unnecessary. The operator therefore is free to perform the more desired and less fatiguing steering and control functions.

Many changes and modifications could be made to the invention without departing from the spirit thereof. For instance, while the brake component of the drive train is preferably located within the gearbox 40, that need not be the case. Moreover, if the brake is incorporated into the gearbox 40, it could be used with drives other than worm drives, so long as the drive has a torque transfer system having a component that experiences thrust upon the transfer or drive torque thereto. Virtually any drive component having angled teeth, i.e., ones that extend at an angle that is offset from the radial, could suffice.

Still other changes that could be made to the invention without departing from the spirit thereof will become apparent from the appended claims.

What is claimed is:

1. A gearbox for a rotary concrete finishing trowel, comprising:
   (A) a housing;
   (B) a rotary input element that is supported by said housing and that is configured to be operatively connected to an output element of a prime mover of the trowel;
   (C) a rotary output element that is supported by said housing and that is configured to be operatively connected to a rotor of the trowel;
   (D) a torque transfer system that is supported by said housing and that is configured to transfer torque from said input element to said output element, said torque transfer system being constructed such that delivery of torque thereto by said input element imposes an axial thrust on at least one component thereof that drives said component to move axially from a first position thereof to a second position thereof; and
   (E) a brake that cooperates with said torque transfer system so as to automatically
      1) release when said component is in said second position thereof, thereby permitting torque transfer from said input element, through said torque transfer system, and to said output element, and
      2) engage when said component is in said first position thereof, thereby resisting torque transfer from said output element, through said torque transfer system, and to said input element.

2. The gearbox as recited in claim 1, wherein said component comprises an angled drive gear that is subject to axial reaction forces upon torque transfer between itself and a mating driven gear of said torque transfer system.

3. The gearbox as recited in claim 2, wherein said drive gear comprises a worm that meshes with a worm gear of said torque transfer system, said worm gear imposing an axial thrust on said worm upon the delivery of drive torque to said torque transfer system by said input element.

4. The gearbox as recited in claim 3, wherein said worm is mounted on a shaft that moves axially with said worm, and wherein said brake is mounted on said shaft so as to be movable between the released and engaged positions thereof upon movement of said worm between the second and first positions thereof.

5. The gearbox as recited in claim 4, wherein said brake comprises a cone brake including
   (A) a stationary cup, and
   (B) a cone that is mounted on said shaft so as to contact said cup when said brake is engaged and to be spaced from said cup when said brake is released.

6. The gearbox as recited in claim 4, further comprising a return spring that is configured to bias said brake toward said engaged position.

7. The gearbox as recited in claim 6, wherein said torque transfer system further comprises a bearing that rotatably supports said shaft in said housing and that moves axially during movement of said shaft between the second and first positions thereof, and wherein said spring acts on said bearing.

8. The gearbox as recited in claim 7, further comprising a second, axially stationary bearing that rotatably supports said shaft in said housing and that accommodates axial movement of said shaft relative thereto.

9. The gearbox as recited in claim 6, wherein said spring comprises a wave spring that surrounds said shaft and that is disposed between said bearing and a stationary internal component of said gearbox.

10. The gearbox as recited in claim 2, wherein said torque transfer system comprises a shaft that moves axially with said angled drive, and wherein said brake comprises a cone brake including
    (A) a stationary cup having a tapered inner peripheral surface, and
    (B) a cone having a tapered outer peripheral surface, said cone being mounted on said shaft so as to contact said cup when said brake is engaged and to be spaced from said cup when said brake is released.

11. The gearbox as recited in claim 10, wherein said shaft comprises an input shaft serving as said input element.

12. A gearbox for a rotary concrete finishing trowel, comprising:
    (A) a housing;
    (B) a rotary input shaft that is supported by said housing and that is configured to be operatively coupled to an output element of a prime mover of the trowel;
    (C) a rotary output shaft that is supported by said housing and that is configured to be operatively coupled to a rotor of the trowel;
    (D) a torque transfer system that is supported by said housing and that is configured to transfer torque from said input shaft to said output shaft, said torque transfer system including a worm and a worm gear that meshes with said worm gear, said worm being movable axially, upon delivery of drive torque thereto by said input shaft, from a first position thereof to a second position thereof; and
    (E) a brake that cooperates with said torque transfer system so as to automatically
       1) release when said worm is in said second position thereof, thereby permitting torque transfer from said input shaft, through said torque transfer system, and to said output shaft, and
       2) engage when said worm is in said first position thereof, thereby resisting torque transfer from said output shaft, through said torque transfer system, and to said input shaft.

13. The gearbox as recited in claim 12, wherein said worm is fixed to said input shaft so that said input shaft and said worm gear move axially together, and wherein said brake is mounted on said input shaft so as to be movable between the released and engaged positions thereof upon movement of said worm between the second and first positions thereof.

14. The gearbox as recited in claim 13, wherein said brake comprises a cone brake including
   (A) a stationary cup mounted in said housing, and
   (B) a cone that is mounted on said input shaft so as to contact said cup when said brake is engaged and to be spaced from said cup when said brake is released.

15. The gearbox as recited in claim 14, further comprising a return spring that is configured to bias said cone toward the brake engaged position.

16. The gearbox as recited in claim 15, wherein said torque transfer system further comprises a bearing that rotatably supports said input shaft in said housing and that moves axially with said input shaft, and wherein said spring acts on said bearing.

17. The gearbox as recited in claim 16, further comprising a second, axially stationary bearing that rotatably supports said shaft in said housing and that accommodates axial movement of said shaft relative thereto.

18. The gearbox as recited in claim 16, wherein said spring is a wave spring that surrounds said input shaft and that is disposed between said bearing and a stationary internal component of said gearbox.

19. A concrete finishing trowel comprising:
   (A) a frame;
   (B) a motor that is mounted on said frame and that has a rotatable output;
   (C) a rotor that includes a plurality of blades and a hub;
   (D) a torque transfer system that transfers torque from said motor output to said rotor hub, said torque transfer system being constructed such that delivery of drive torque thereto by said motor output shaft imposes an axial thrust on at least one component thereof that drives said component to move axially from a first position thereof to a second position thereof; and
   (E) a brake that cooperates with said torque transfer system so as to automatically
      1) release when said component is in said second position thereof, thereby permitting torque transfer from said motor output shaft, through said torque transfer system, and to said rotor, and
      2) engage when said component is in said first position thereof, thereby resisting torque transfer from said rotor, through said torque transfer system, and to said motor output shaft.

20. The trowel as recited in claim 19, further comprising a gearbox containing said torque transfer system, said gearbox comprising a housing, an input shaft that is supported by said housing and that couples said motor output shaft to said torque transfer system, and an output shaft that is supported by said housing and that couples said torque transfer system to said rotor hub.

21. The trowel as recited in claim 20, wherein said component comprises an angled drive gear that is subject to axial reaction forces upon torque transfer between itself and a mating driven gear of said torque transfer system.

22. The trowel as recited in claim 21, wherein said drive gear comprises a worm that meshes with a worm gear of said torque transfer system, said worm gear imposing the axial thrust on said worm upon the delivery of drive torque to said torque transfer system by said motor output shaft.

23. The trowel as recited in claim 22, wherein said worm is fixed to said input shaft so that said input shaft and said worm move axially together, and wherein said brake is mounted on said input shaft so as to be movable between the released and engaged positions thereof upon movement of said worm between the second and first positions thereof.

24. The trowel as recited in claim 19, wherein said brake comprises a cone brake including
   (A) a stationary cup, and
   (B) a cone that moves with said component so as to contact said cup when said brake is engaged and to be spaced from said cup when said brake is released.

25. The trowel as recited in claim 24, further comprising a return spring that is configured to bias said cone toward the brake engaged position.

26. The trowel as recited in claim 25, wherein said torque transfer system further comprises a bearing that moves axially with said component, and wherein said spring acts on said bearing.

27. The trowel as recited in claim 19, wherein said trowel is walk behind trowel comprising a single rotor and an operator's control handle accessible by an operator walking behind said trowel.

28. The trowel as recited in claim 24, wherein said trowel has a magneto-based electrical system incapable of generating sufficient electrical power to operate an electric brake.

* * * * *